Jan. 27, 1931.  J. R. GREEN  1,790,373
ICE CREAM FREEZER
Filed Jan. 12, 1929  2 Sheets-Sheet 1
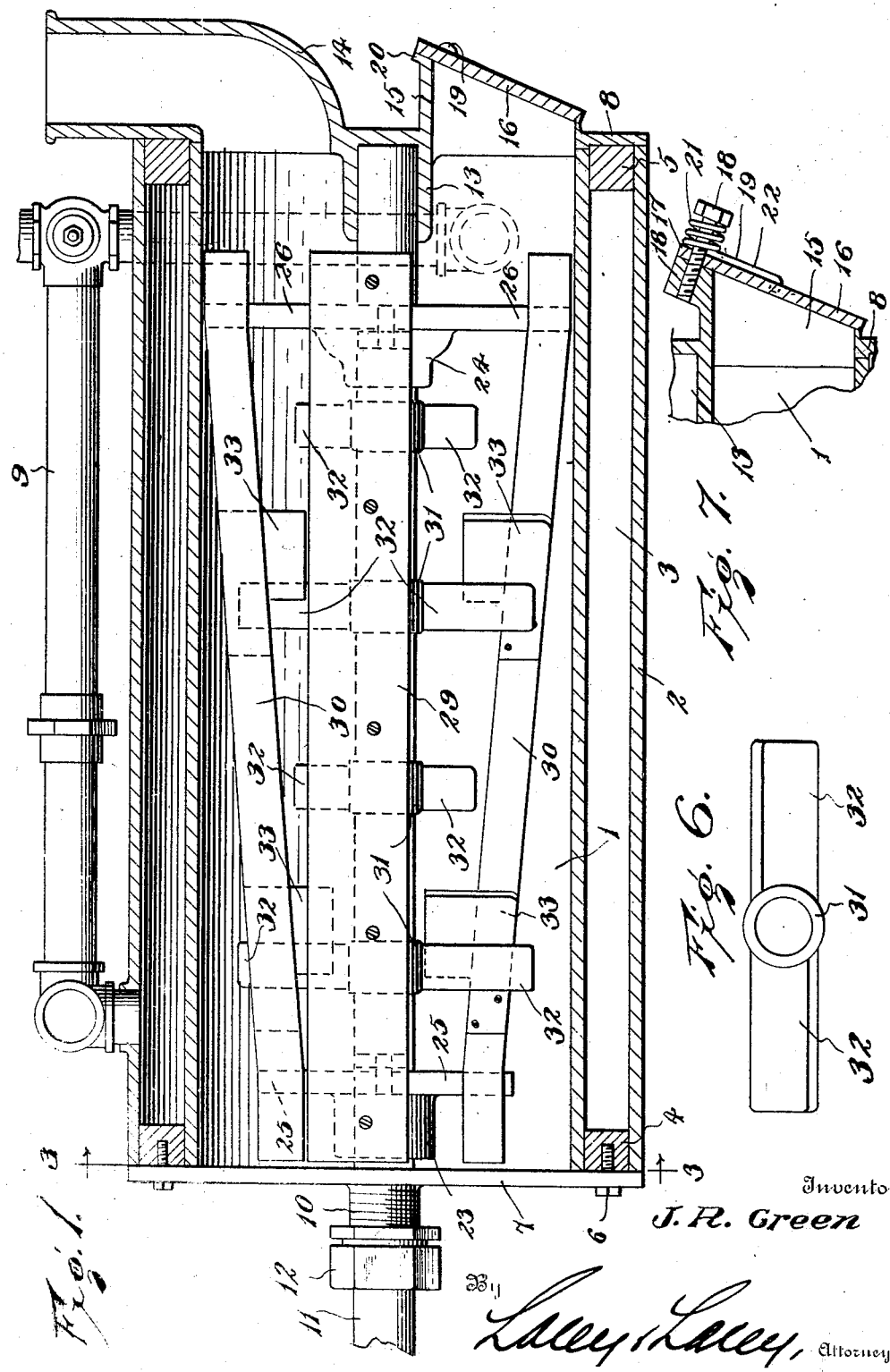
Inventor
J. R. Green
By Laley & Laley, Attorneys

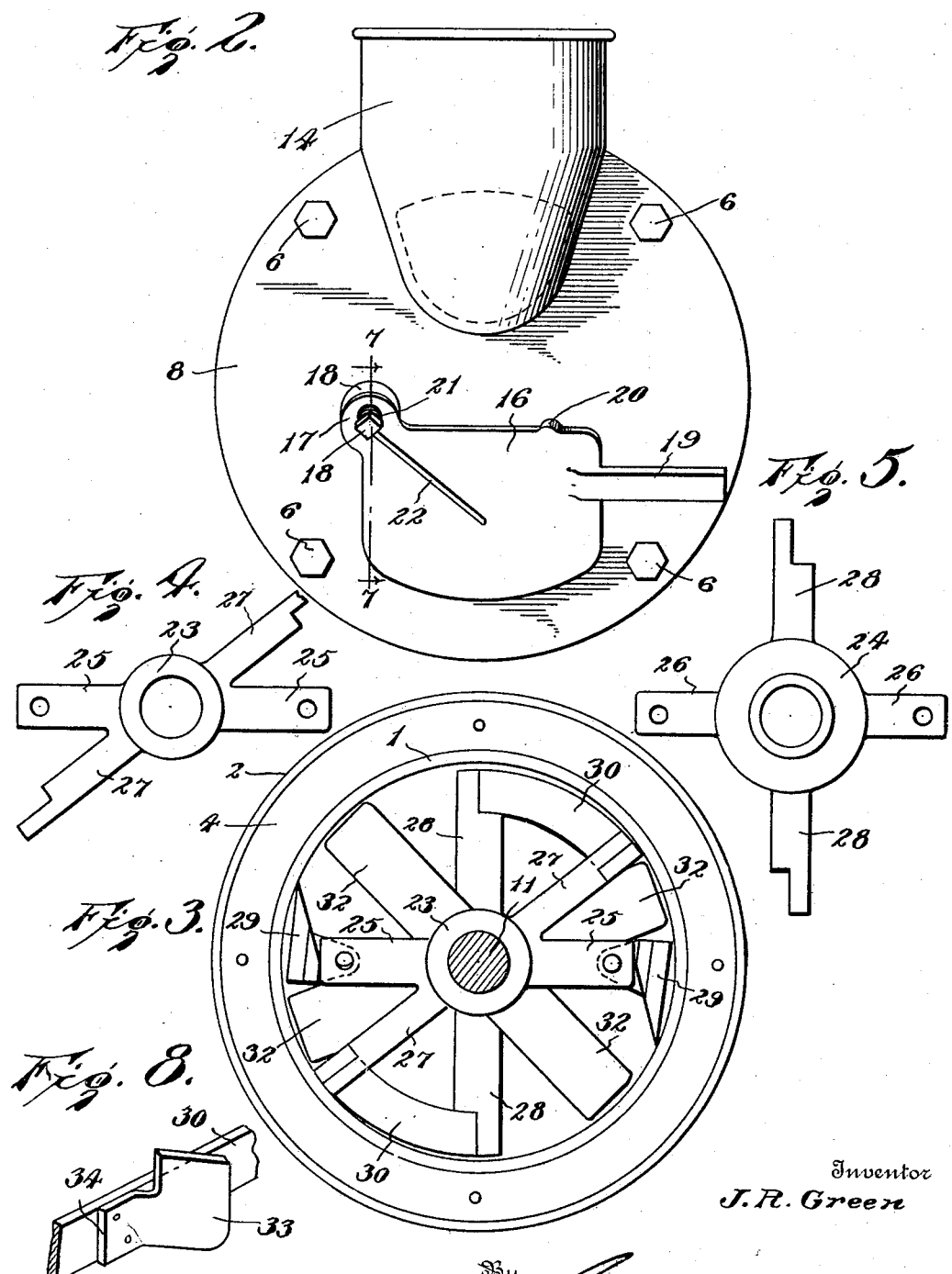

Patented Jan. 27, 1931

1,790,373

UNITED STATES PATENT OFFICE

JAMES R. GREEN, OF EVERETT, WASHINGTON

ICE-CREAM FREEZER

Application filed January 12, 1929. Serial No. 332,041.

This invention relates to an ice cream freezer and more particularly to an ice cream freezer of the type disclosed in my co-pending application, filed September 15, 1928, Serial No. 306,234.

One object of the invention is to provide an ice cream freezer of the type disclosed in the co-pending application referred to above having an improved type of head at the end of its cylinder through which cream is to be poured into the freezer and ice cream pass out of the same.

Another object of the invention is to provide the freezer with an improved type of dasher including means for very effectively agitating the cream and circulating it through the cylinder during the process of freezing.

Another object of the invention is to so form the dasher that it will not only cause the cream to be circulated longitudinally of the cylinder during rotation of the dasher but also cause the cream to be thoroughly agitated and thereby cause the cream to be aerated and become very fluffy.

Another object of the invention is to provide the dasher with an improved arrangement of agitating blades and circulating blades which together with scraping blades are all carried by a single shaft which extends axially of the cylinder and is rotatably mounted in bearings carried by heads closing the ends of the cylinder.

The invention is illustrated in the accompanying drawings, wherein

Figure 1 is a longitudinal sectional view through the improved ice cream freezer, Fig. 2 is a view in end elevation looking at one end of the freezer, Fig. 3 is a view looking into the cylinder from the other end of the freezer, the view being taken on the line 3—3 of Fig. 1, Figs. 4 and 5 are views of the means carried by the dasher shaft for supporting the propelling strips and scrapers forming part of the dasher, Fig. 6 is a view of one of the agitators carried by the dasher shaft, Fig. 7 is a fragmentary sectional view taken on the line 7—7 of Fig. 2, and Fig. 8 is a fragmentary perspective view showing a portion of one of the propelling strips and an agitating blade carried thereby.

The improved ice cream freezer includes a cylinder 1 which may be of any length and diameter desired and is open at its ends. This cylinder is disposed within a cylindrical jacket 2 of such diameter that it is spaced from the walls of the cylinder and thereby provides a chamber 3 about the cylinder, the ends of which are closed by rings 4 and 5. The rings serve to retain the jacket in proper position about the cylinder and may be brazed or otherwise secured in place. Threaded sockets are formed in the rings to receive securing bolts 6 which pass through the heads 7 and 8 and, therefore, the heads will be firmly secured to the rings in closing relation to the ends of the cylinder but may be removed when necessary. A freezing medium is to be circulated through the chamber 3 and any system desired for circulating the freezing medium may be employed although the system disclosed in my co-pending application is preferably used. A portion of the circulating system is shown in Fig. 1 and indicated in general by the numeral 9, and it is to be understood that the gas or other freezing medium is to enter the chamber adjacent one end of the cylinder and after moving through the chamber pass out of the same near its other end.

The head 7 provided at one end of the cylinder is formed with a neck 10 projecting outwardly therefrom and constituting a bearing through which the shaft 11 extends into the cylinder and a packing gland 12 is provided so that cream in the cylinder will be prevented from leaking out around the shaft when the freezer is in operation. The shaft extends axially through the cylinder and the head 8 is formed with an inwardly extending bearing 13 which receives the shaft, as shown in Fig. 1, and together with the bearing 10 rotatably supports the shaft. It will thus be seen that the shaft will be allowed to rotate freely in the cylinder and will be prevented from moving out of axial relation thereto. Above the bearing 13 the head 8 is formed with a hopper 14 open at its upper end, as shown in Fig. 1, so that cream may be poured into the same and having its lower end communicating with an opening formed through the head so that cream poured into this hopper will flow into the cylinder. An outlet neck 15 projects outwardly from the head 8 below the bearing and at its outer end is cut at an incline, as shown in Figs. 1 and 7. A closure gate or door 16 fits flat against the outer end of the outlet neck or spout 15 and at one corner is formed with an ear 17 through which is passed a bolt 18, the threaded end portion of which is received in a threaded opening formed in a block 18 extending upwardly from the spout, as shown in Fig. 7. From the other end of the door extends an operating handle 19, and in order to limit downward swinging movement of the door in a closing direction, there has been provided a lug or finger 20 which extends from the upper edge thereof and is adapted to contact with the spout when the door is fully closed. A coiled spring 21 is disposed about the bolt between its head and the ear 17 and from the inner end of the spring extends an arm 22 which is disposed diagonally across the outer surface of the door, as shown in Fig. 2, and terminates in a bent end seated in a notch formed in the door. By this arrangement the door will be pressed firmly against the outer end of the spout and there will be no danger of cream leaking from the freezer when the door is closed.

The dasher by means of which cream is to be agitated and circulated through the cylinder and at the same time cream which has hardened against the walls of the cylinder scraped loose includes the shaft 11 which is rotatably mounted in axial relation to the cylinder as previously set forth and has one end portion projecting outwardly so that a crank handle or other turning means may be applied thereto in order to impart rotary motion to the shaft. Collars 23 and 24 are fast upon the shaft adjacent the ends of the cylinder and these collars carry arms 25 and 26 and other arms 27 and 28. The arms 25 and 26 extend in opposed relation to each other, whereas the arms 27 and 28 are offset. Therefore, the scrapers 29 which are pivotally connected with the arms 25 and 26 will extend longitudinally through the cylinder substantially parallel to the walls thereof whereas the propelling blades or strips 30 which are secured against the recess or reduced free end portions of the arms 27 and 28 will extend spirally through the cylinder, as clearly shown in Fig. 3, and as the dasher rotates the spirally extending blades or strips 30 will cause the cream which has been transformed into a semi-solid mass by freezing to be moved longitudinally through the cylinder and if the door 16 is opened cream will be forced through the outlet neck into a receptacle provided to receive the same. The scrapers 29 bear against the walls of the cylinder and serve to scrape cream from the walls in the usual manner during rotation of the dasher.

It is not only desired to have the cream circulate through the cylinder during the freezing operation but also to have it thoroughly agitated so that it will be aerated and thereby cause it to be very fluffy and increase its bulk. I have, therefore, provided agitators which are spaced from each other longitudinally of the shaft. Each of these agitators is formed as shown in Fig. 6 and includes a hub or sleeve 31 which is secured firmly upon the shaft and from which extends blades 32 pitched at such an angle that they serve not only as agitators but also to assist the strips 30 to propel the cream through the cylinder. By referring to Fig. 3, it will be seen that the agitators are so arranged upon the shaft that their blades extend radially thereof between the arms of the supports for the scrapers and propelling strips and, therefore, will very effectively cooperate with the propelling strips to agitate and propel the cream. Blades 33 are secured against the propelling strips 30 by rivets passed through their shanks 34 which fit flat against side faces of the propelling strips and these blades project diagonally from the strips and constitute baffles which divert cream moved by the strips towards the center of the cylinder and thereby cause the cream to be more thoroughly mixed and in addition assist in agitating it while freezing. It will thus be seen that due to the arrangement of the blades and strips shown in Figs. 1 and 3 the cream will be very thoroughly agitated and aerated while it is freezing and it will be kept moving through the cylinder during the freezing operation. It will also be noted that when it is desired to remove cream from the freezer it is merely necessary to open the door 16 while the dasher is rotating and the cream will be fed out of the discharge spout and into a box or other receptacle placed in position to receive the cream. When it is necessary to clean the freezer, the screws or bolts 6 which retain the heads in place are removed and these heads together with the dasher may be removed from the cylinder. Therefore, all portions of the freezer may be thoroughly cleaned and the freezer then again assembled.

Having thus described the invention, I claim:

An ice cream freezer comprising spaced concentric cylinders, heads closing the cylinders, a rotary shaft disposed axially of the inner cylinder, collars fast upon said shaft and provided with arms extending radially of the shaft, opposed scrapers pivoted to corresponding arms and extending parallel to the shaft and contacting with walls of the inner cylinder, opposed propellers extending spirally in the inner cylinder intermediate the scrapers and attached to offset arms of the collars, blades spaced from each other longitudinally of the spiral propellers and each having a shank fixed to a propeller, said blades projecting diagonally from the propellers and radially inward to agitate and move the cream towards the center of the cylinder, and agitators at intervals in the length of the shaft each having a hub fast thereto and blades projecting from its hub and disposed intermediate the propellers and scrapers and extending radially of the shaft between the first-mentioned blades and arranged spirally to supplement the action of the propellers in moving the cream toward the delivery end of the freezer.

In testimony whereof I affix my signature.

JAMES R. GREEN. [L. S.]